United States Patent
Delfort et al.

(10) Patent No.: US 9,962,645 B2
(45) Date of Patent: May 8, 2018

(54) ABSORBENT SOLUTION CONTAINING A MIXTURE OF 1,2-BIS-(2-DIMETHYLAMINOETHOXY)-ETHANE AND OF 2-[2-(2-DIMETHYLAMINOETHOXY)-ETHOXY]-ETHANOL, AND METHOD OF REMOVING ACID COMPOUNDS FROM A GASEOUS EFFLUENT

(71) Applicant: IFP Energies nouvelles, Rueil-Malmaison (FR)

(72) Inventors: Bruno Delfort, Paris (FR); Dominique Le Pennec, Orgerus (FR); Julien Grandjean, Lyons (FR); Thierry Huard, Saint Symphorien D'Ozon (FR); Laetitia Giraudon, Saint Michel sur Rhone (FR); Aurelie Wender, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days. days.

(21) Appl. No.: 15/313,882

(22) PCT Filed: May 12, 2015

(86) PCT No.: PCT/EP2015/060519
§ 371 (c)(1),
(2) Date: Nov. 23, 2016

(87) PCT Pub. No.: WO2015/180958
PCT Pub. Date: Dec. 3, 2015

(65) Prior Publication Data
US 2017/0197176 A1    Jul. 13, 2017

(30) Foreign Application Priority Data

May 26, 2014   (FR) .................... 14 54713

(51) Int. Cl.
*B01D 53/78*     (2006.01)
*B01D 53/14*     (2006.01)
(Continued)

(52) U.S. Cl.
CPC ..... *B01D 53/1493* (2013.01); *B01D 53/1425* (2013.01); *B01D 53/1468* (2013.01);
(Continued)

(58) Field of Classification Search
None
See application file for complete search history.

(56) References Cited

U.S. PATENT DOCUMENTS

| 4,405,582 A | 9/1983 | Stogryn et al. |
| 6,852,144 B1 | 2/2005 | Wagner et al. |

(Continued)

FOREIGN PATENT DOCUMENTS

| DE | 10 2005 043142 A1 | 4/2006 | |
| DE | 102005043142 | * 4/2006 | ............ B01D 53/14 |

(Continued)

OTHER PUBLICATIONS

International Search Report for PCT/EP2015/060519 dated Jul. 20, 2015; English translation submitted herewith (5 Pages).

*Primary Examiner* — Daniel Berns
(74) *Attorney, Agent, or Firm* — Fitch, Even, Tabin & Flannery, LLP

(57) ABSTRACT

The invention relates to an absorbent solution for absorbing acid compounds, such as hydrogen sulfide and carbon dioxide, in a gaseous effluent, containing water and a mixture of amines comprising 1,2-bis-(2-dimethylaminoethoxy)-ethane and 2-[2-(2-dimethylaminoethoxy)-ethoxy]-ethanol, of respective formulas (I) and (II) below, and to a method of removing acid compounds contained in a gaseous effluent using this solution.

(Continued)

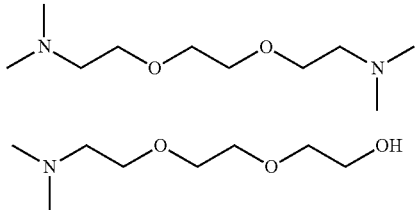

(51) Int. Cl.
*B01D 53/52* (2006.01)
*B01D 53/96* (2006.01)
(52) U.S. Cl.
CPC .... *B01D 53/1475* (2013.01); *B01D 2252/103* (2013.01); *B01D 2252/2041* (2013.01); *B01D 2252/20405* (2013.01); *B01D 2252/20431* (2013.01); *B01D 2252/20484* (2013.01); *B01D 2252/504* (2013.01); *B01D 2256/00* (2013.01); *B01D 2256/16* (2013.01); *B01D 2256/20* (2013.01); *B01D 2256/24* (2013.01); *B01D 2256/245* (2013.01); *B01D 2257/306* (2013.01); *B01D 2257/308* (2013.01); *B01D 2257/504* (2013.01); *B01D 2258/025* (2013.01); *B01D 2258/0233* (2013.01); *B01D 2258/0283* (2013.01); *B01D 2258/0291* (2013.01); *B01D 2258/05* (2013.01); *Y02C 10/06* (2013.01)

17 Claims, 2 Drawing Sheets

(56) References Cited

U.S. PATENT DOCUMENTS 7,405,327 B2 * 7/2008 Haese .................. C07C 209/16
564/446
2013/0243676 A1 9/2013 Siskin et al.

FOREIGN PATENT DOCUMENTS

| | | | | |
|---|---|---|---|---|
| FR | 2 900 841 A1 | | 11/2007 | |
| FR | 2900841 | * | 11/2007 | ............. B01D 53/40 |
| FR | 2 961 114 A1 | | 12/2011 | |
| FR | 2961114 | * | 12/2011 | ............. B01D 53/14 |
| JP | 2002-179756 | * | 6/2002 | ............. C08G 18/18 |
| JP | 2002/179756 | * | 6/2002 | ............. C08G 18/18 |

* cited by examiner

ABSORBENT SOLUTION CONTAINING A MIXTURE OF 1,2-BIS-(2-DIMETHYLAMINOETHOXY)-ETHANE AND OF 2-[2-(2-DIMETHYLAMINOETHOXY)-ETHOXY]-ETHANOL, AND METHOD OF REMOVING ACID COMPOUNDS FROM A GASEOUS EFFLUENT

CROSS-REFERENCE TO RELATED APPLICATIONS

This application is a U.S. national phase application filed under 35 U.S.C. § 371 of International Application No. PCT/EP2015/060519, filed May 12, 2015, designating the United States, which claims priority from French Patent Application No. 14/54.713, filed May 26, 2014, which are hereby incorporated herein by reference in their entirety for all purposes.

FIELD OF THE INVENTION

The present invention relates to the field of gaseous effluent deacidizing methods. The invention is advantageously applied for treating gas of industrial origin and natural gas.

BACKGROUND OF THE INVENTION

Gas deacidizing methods using aqueous amine solutions are commonly used for removing acid compounds present in a gas, notably carbon dioxide ($CO_2$), hydrogen sulfide ($H_2S$), carbon oxysulfide (COS), carbon disulfide ($CS_2$), sulfur dioxide ($SO_2$) and mercaptans (RSH) such as methylmercaptan ($CH_3SH$), ethylmercaptan ($CH_3CH_2SH$) and propylmercaptan ($CH_3CH_2CH_2SH$). The gas is deacidized by being contacted with the absorbent solution, then the absorbent solution is thermally regenerated.

These acid gas deacidizing methods are also commonly known as "solvent scrubbing", using a solvent referred to as "chemical", as opposed to the use of a solvent referred to as "physical" for absorption that is not based on chemical reactions.

A chemical solvent corresponds to an aqueous solution comprising a reactant that reacts selectively with the acid compounds ($H_2S$, $CO_2$, COS, $CS_2$, etc.) present in the treated gas so as to form salts, without reacting with the other non-acid compounds in the gas. After contacting with the solvent, the treated gas is depleted in acid compounds that are selectively transferred as salts into the solvent. The chemical reactions are reversible, which allows the acid compound-laden solvent to be subsequently deacidized, for example under the action of heat, so as to release on the one hand the acid compounds in form of gas that can then be stored, converted or used for various applications, and on the other hand to regenerate the solvent that goes back to its initial state and can thus be used again for a new reaction stage with the acid gas to be treated. The reaction stage of the solvent with the acid gas is commonly referred to as absorption stage, and the stage where the solvent is deacidized is referred to as solvent regeneration stage.

In general, the performances of acid compounds separation from gas in this context mainly depend on the nature of the reversible reaction selected. Conventional acid gas deacidizing methods are generally referred to as "amine methods", i.e. based on the reactions of the acid compounds with amines in solution. These reactions are part of the overall framework of acid-base reactions. $H_2S$, $CO_2$ or COS are for example acid compounds, notably in the presence of water, whereas amines are basic compounds. The reaction mechanisms and the nature of the salts obtained generally depend on the structure of the amines used.

For example, document U.S. Pat. No. 6,852,144 describes a method of removing acid compounds from hydrocarbons using a water-N-methyldiethanolamine or water-triethanolamine absorbent solution with a high proportion of a compound belonging to the following group: piperazine and/or methylpiperazine and/or morpholine.

The performances of acid gas deacidizing methods using amine scrubbing directly depend on the nature of the amine(s) present in the solvent. These amines can be primary, secondary or tertiary. They can have one or more equivalent or different amine functions per molecule.

In order to improve the performances of deacidizing methods, increasingly efficient amines are continuously sought.

One limitation of the absorbent solutions commonly used in deacidizing applications is insufficient $H_2S$ absorption selectivity over $CO_2$. Indeed, in some natural gas deacidizing cases, selective $H_2S$ removal is sought by limiting to the maximum $CO_2$ absorption. This constraint is particularly important for gases to be treated already having a $CO_2$ content that is less than or equal to the desired specification. A maximum $H_2S$ absorption capacity is then sought with maximum $H_2S$ absorption selectivity over $CO_2$. This selectivity allows to maximize the amount of treated gas and to recover an acid gas at the regenerator outlet having the highest $H_2S$ concentration possible, which limits the size of the sulfur chain units downstream from the treatment and guarantees better operation. In some cases, an $H_2S$ enrichment unit is necessary for concentrating the acid gas in $H_2S$. In this case, the most selective amine is also sought. Tertiary amines such as N-methyldiethanolamine or hindered secondary amines exhibiting slow reaction kinetics with $CO_2$ are commonly used, but they have limited selectivities at high $H_2S$ loadings.

It is well known to the person skilled in the art that tertiary amines or secondary amines with severe steric hindrance have slower $CO_2$ capture kinetics than less hindered primary or secondary amines. On the other hand, tertiary or secondary amines with severe steric hindrance have instantaneous $H_2S$ capture kinetics, which allows to achieve selective $H_2S$ removal based on distinct kinetic performances.

Various documents propose using hindered tertiary or secondary amines, in particular hindered tertiary or secondary diamines, in solution for deacidizing acid gases.

Thus, U.S. Pat. No. 4,405,582 describes a method for selective absorption of sulfur-containing gases with an absorbent containing a diaminoether at least one amine function of which is tertiary and whose other amine function is tertiary or secondary with severe steric hindrance, the nitrogen atom being in the latter case linked to either at least one tertiary carbon or to two secondary carbon atoms. The two amine functions and the carbons of the main chain can be substituted by alkyl or hydroxyalkyl radicals. These diaminoethers can also be mixed with other amino compounds, preferably methyldiethanolamine.

Another limitation of the absorbent solutions commonly used in total deacidizing applications is too slow $CO_2$ or COS capture kinetics. In cases where the desired $CO_2$ or COS specifications level is very high, the fastest possible reaction kinetics is sought so as to reduce the height of the absorption column. Indeed, this equipment under pressure represents a significant part of the investment costs of the process.

Whether seeking maximum $CO_2$ and COS capture kinetics in a total deacidizing application or minimum $CO_2$ capture kinetics in a selective application, it is always desirable to use an absorbent solution having the highest cyclic capacity possible. This cyclic capacity, denoted by $\Delta\alpha$, corresponds to the loading difference ($\alpha$ designates the number of moles of absorbed acid compounds $n_{acid\ gas}$ per kilogram of absorbent solution) between the absorbent solution discharged from the bottom of the absorption column and the absorbent solution fed to said column. Indeed, the higher the cyclic capacity of the absorbent solution, the lower the absorbent solution flow rate required for deacidizing the gas to be treated. In gas treatment methods, reduction of the absorbent solution flow rate also has a great impact on the reduction of investments, notably as regards absorption column sizing.

Another essential aspect of gas or industrial fumes treatment operations using a solvent remains the regeneration of the separation agent. Regeneration through expansion and/or distillation and/or entrainment by a vaporized gas referred to as "stripping gas" is generally considered depending on the absorption type (physical and/or chemical). The energy consumption required for solvent regeneration can be very high, which is in particular the case when the partial pressure of acid gases is low, and it can represent a considerable operating cost for the $CO_2$ capture process.

It is well known to the person skilled in the art that the energy required for regeneration by distillation of an amine solution can be divided into three different items: the energy required for heating the absorbent solution between the top and the bottom of the regenerator, the energy required for lowering the acid gas partial pressure in the regenerator by vaporization of a stripping gas, and the energy required for breaking the chemical bond between the amine and the $CO_2$.

These first two items are proportional to the absorbent solution flows to be circulated in the plant so as to achieve a given specification. In order to decrease the energy consumption linked with the regeneration of the solvent, the cyclic capacity of the solvent is therefore once again preferably maximized. Indeed, the higher the cyclic capacity of the absorbent solution, the lower the absorbent solution flow rate required for deacidizing the gas to be treated.

There is therefore a need, in the field of gas deacidizing, for compounds that are good candidates for acid compounds removal from a gaseous effluent, notably, but not exclusively, selective removal of $H_2S$ over $CO_2$, and that allow operation at lower operating costs (including the regeneration energy) and investment costs (including the cost of the absorption column).

DESCRIPTION OF THE INVENTION

The inventors have highlighted that absorbent solutions based on tertiary or secondary diamines with severe steric hindrance and likely to contain other amines are not equivalent in terms of performance for use in acid gas treatment in an industrial process.

The object of the present invention is an absorbent solution for removing acid compounds from a gaseous effluent, containing a mixture of a particular tertiary diamine, namely 1,2-bis-(2-dimethylaminoethoxy)-ethane, and of a particular tertiary monoamine, namely 2-[2-(2-dimethylaminoethoxy)-ethoxy]-ethanol, and a method of removing acid compounds contained in a gaseous effluent using such a solution.

The inventors have highlighted that using the mixture in aqueous solution according to the invention allows to obtain improved performances in terms of cyclic absorption capacity for acid gases and of $H_2S$ absorption selectivity over $CO_2$, notably a higher cyclic absorption capacity for acid gases and a higher $H_2S$ absorption selectivity over $CO_2$ than reference amines such as N-methyldiethanolamine (MDEA) or 1,2-bis-(2-dimethylaminoethoxy)-ethane used alone or in admixture in aqueous solution.

The inventors have notably discovered that, surprisingly enough, using a mixture in aqueous solution according to the invention allows to obtain a higher acid gas absorption capacity than an absorbent solution of 1,2-bis-(2-dimethylaminoethoxy)-ethane with the same 1,2-bis-(2-dimethylaminoethoxy)-ethane mass concentration as the total amine mass concentration in the solution according to the invention, whereas the solution according to the invention has a lower amine function molar concentration.

Using a mixture according to the invention also allows to obtain a higher acid gas absorption capacity than an absorbent solution of 1,2-bis-(2-dimethylaminoethoxy)-ethane with the same 1,2-bis-(2-dimethylaminoethoxy)-ethane mass concentration as the solution according to the invention.

Surprisingly, the inventors have also discovered that using a mixture according to the invention allows to obtain a higher acid gas absorption capacity than a mixture of 1,2-bis-(2-dimethylaminoethoxy)-ethane and of N-methyldiethanolamine (MDEA) in aqueous solution at an equivalent 1,2-bis-(2-dimethylaminoethoxy)-ethane concentration and total amine concentration, whereas the latter solution (1,2-bis-(2-dimethylaminoethoxy)-ethane and MDEA) has a higher amine function molar concentration.

SUMMARY OF THE INVENTION

According to a first aspect, the invention relates to an absorbent solution for removing acid compounds contained in a gaseous effluent, comprising:
water;
an amine mixture comprising 1,2-bis-(2-dimethylaminoethoxy)-ethane of formula (I) as follows:

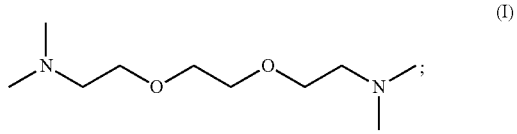

and
2-[2-(2-dimethylaminoethoxy)-ethoxy]-ethanol of formula (II) as follows:

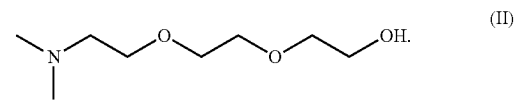

Preferably, the absorbent solution comprises between 5 wt. % and 95 wt. % of amine mixture, preferably between 10 wt. % and 90 wt. % of amine mixture, and between 5 wt. % and 95 wt. % of water, preferably between 10 wt. % and 90 wt. % of water.

Advantageously, the mass concentration ratio of 1,2-bis-(2-dimethylaminoethoxy)-ethane to 2-[2-(2-dimethylaminoethoxy)-ethoxy]-ethanol ranges between 0.25 and 10, preferably between 0.5 and 2.

Furthermore, the absorbent solution can comprise between 5 wt. % and 50 wt. % of at least one additional amine, said additional amine being either a tertiary amine or a secondary amine having two secondary carbons at nitrogen alpha position or at least one tertiary carbon at nitrogen alpha position.

Said additional amine can be a tertiary amine selected from among the group made up of:
N-methyldiethanolamine,
triethanolamine,
diethylmonoethanolamine,
dimethylmonoethanolamine,
ethyldiethanolamine,
2-(2-dimethylaminoethoxy)-ethanol,
dimethylethylamine,
dimethylethoxyethylamine,
bis(dimethylaminoethyl)ether, and
tetramethylethylenediamine.

The absorbent solution can additionally comprise a non-zero amount less than 30 wt. % of at least one primary amine or secondary amine.

Said primary or secondary amine can be selected from among the group made up of:
monoethanolamine,
diethanolamine,
N-butylethanolamine,
aminoethylethanolamine,
diglycolamine,
piperazine,
1-methylpiperazine,
2-methylpiperazine,
homopiperazine,
N-(2-hydroxyethyl)piperazine,
N-(2-aminoethyl)piperazine,
morpholine,
3-(methylamino)propylamine,
1,6-hexanediamine,
N,N-dimethyl-1,6-hexanediamine,
N,N'-dimethyl-1,6-hexanediamine,
N-methyl-1,6-hexanediamine, and
N,N',N'-trimethyl-1,6-hexanediamine.

The absorbent solution can further comprise at least one physical solvent selected from among the group made up of methanol, ethanol, 2-ethoxyethanol, triethylene glycoldimethylether, tetraethylene glycoldimethylether, pentaethylene glycol-dimethylether, hexaethylene glycoldimethylether, heptaethylene glycol-dimethylether, octaethylene glycoldimethylether, diethylene glycol butoxyacetate, glycerol triacetate, sulfolane, N-methylpyrrolidone, N-methylmorpholin-3-one, N,N-dimethylformamide, N-formyl-morpholine, N,N-dimethyl-imidazolidin-2-one, N-methylimidazole, ethylene glycol, diethylene glycol, triethylene glycol, thiodiglycol and tributyl phosphate.

According to a second aspect, the invention relates to a method of removing acid compounds contained in a gaseous effluent wherein an acid compound absorption stage is carried out by contacting the gaseous effluent with an absorbent solution according to the invention.

Preferably, the acid compound absorption stage is carried out at a pressure ranging between 1 bar and 200 bar, and at a temperature ranging between 20° C. and 100° C.

Preferably, an acid compound-laden absorbent solution is obtained after the absorption stage and at least one stage of regenerating said acid compound-laden absorbent solution is carried out at a pressure ranging between 1 bar and 10 bar, and at a temperature ranging between 100° C. and 180° C.

The gaseous effluent can be selected from among natural gas, syngas, combustion fumes, blast furnace fumes, refinery gas such as syngas, cracked gas, combustible gas, acid gas from an amine plant, Claus tail gas, biomass fermentation gas, cement plant gas and incinerator fumes.

The method according to the invention can be implemented for selectively removing the $H_2S$ over the $CO_2$ from a gaseous effluent comprising $H_2S$ and $CO_2$, preferably natural gas.

BRIEF DESCRIPTION OF THE FIGURES

Other features and advantages of the invention will be clear from reading the description hereafter of embodiments given by way of non limitative example, with reference to the accompanying figures described hereafter.

DETAILED DESCRIPTION OF THE INVENTION

Figure 1:
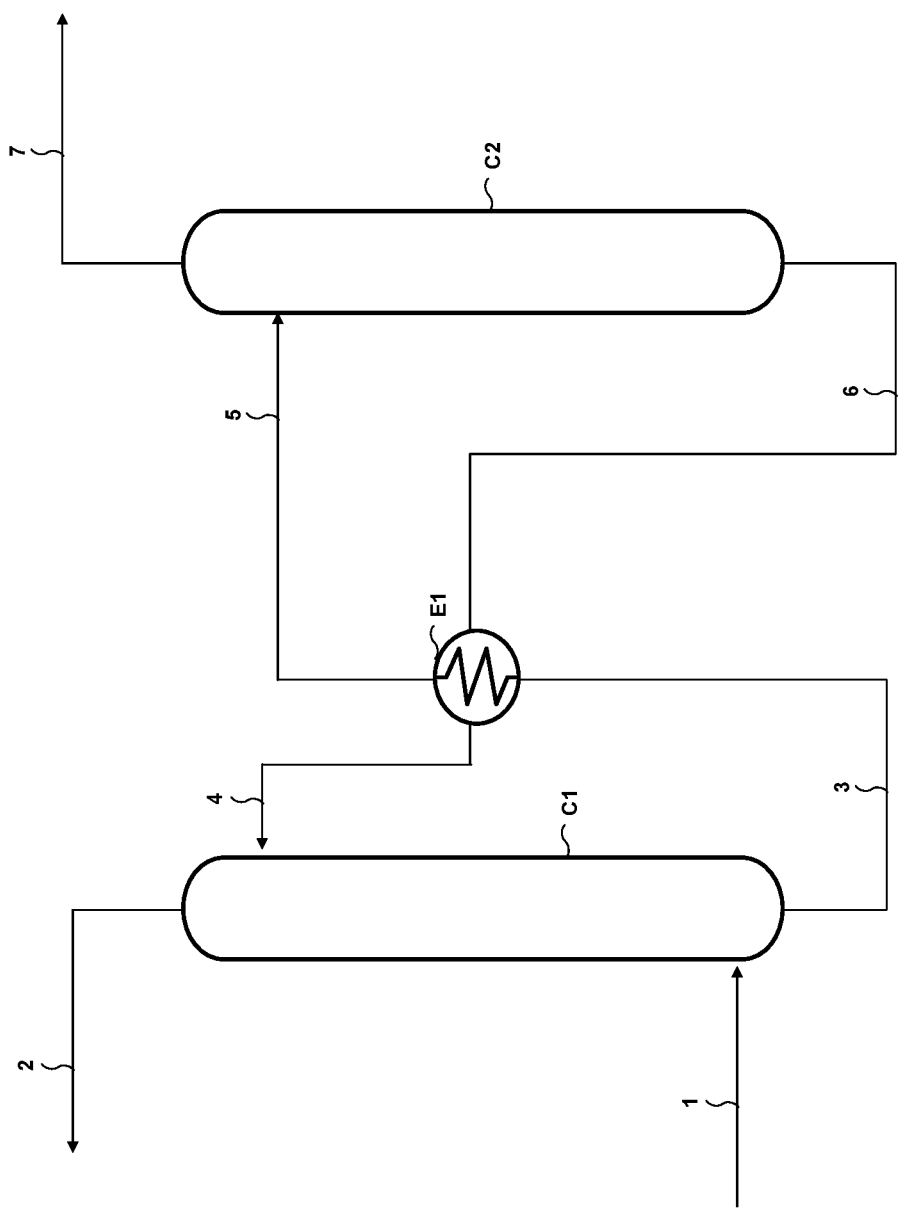
FIG. 1 is a block diagram of the implementation of an acid gas treating method, and FIG. 2 diagrammatically shows synthesis routes for 1,2-bis-(2-dimethylaminoethoxy)-ethane, 2-[2-(2-dimethylaminoethoxy)-ethoxy]-ethanol and a mixture of these two compounds.

The present invention aims to remove acid compounds from a gaseous effluent using an aqueous solution whose composition is detailed hereafter.

Composition of the Absorbent Solution

The absorbent solution used for removing the acid compounds contained in a gaseous effluent comprises at least:
water,
1,2-bis-(2-dimethylaminoethoxy)-ethane of formula (I) as follows:

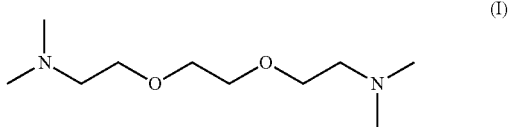

2-[2-(2-dimethylaminoethoxy)-ethoxy]-ethanol of formula (II) as follows:

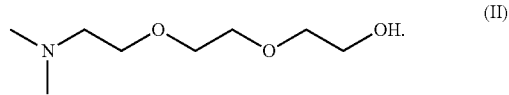

The total concentration of the amine mixture comprising 1,2-bis-(2-dimethylaminoethoxy)-ethane and 2-[2-(2-dimethylaminoethoxy)-ethoxy]-ethanol can be variable in the absorbent solution, ranging for example between 5 wt. % and 95 wt. %, preferably between 10 wt. % and 90 wt. %, more preferably between 20 wt. % and 60 wt. %, and most preferably between 25 wt. % and 50 wt. %, inclusive.

The mass concentration ratio of tertiary diamine of formula (I) to tertiary monoamine of formula (II) preferably ranges between 0.25 and 10, more preferably between 0.5 and 2.

According to an embodiment, the mass concentration ratio of tertiary diamine of formula (I) to tertiary monoamine of formula (II) ranges between 1.4 and 1.6.

The absorbent solution can contain between 5 wt. % and 95 wt. % of water, preferably between 10 wt. % and 90 wt. %, more preferably between 40 wt. % and 80 wt. %, and most preferably between 50 wt. % and 75 wt. %, inclusive.

The sum of the mass fractions expressed in wt. % of the various compounds of the absorbent solution is 100 wt. % of the absorbent solution.

According to an embodiment, the absorbent solution further contains at least one additional amine that is a tertiary amine, such as N-methyldiethanolamine, triethanolamine, diethylmonoethanolamine, dimethylmonoethanolamine, ethyldiethanolamine, 2-(2-dimethylaminoethoxy)-ethanol, dimethylethylamine, dimethylethoxyethylamine, or a tertiary diamine such as bis(dimethylaminoethyl)ether or tetramethylethylenediamine, or a secondary amine with severe steric hindrance, this hindrance being defined by either the presence of two secondary carbons at nitrogen alpha position or at least one tertiary carbon at nitrogen alpha position. Said additional amine is understood to be any compound having at least one severely hindered tertiary or secondary amine function. The concentration of said severely hindered tertiary or secondary additional amine in the absorbent solution can range between 5 wt. % and 50 wt. %, preferably between 5 wt. % and 35 wt. %, more preferably between 5 wt. % and 25 wt. %.

According to an embodiment, the absorbent solution can additionally comprise one or more compounds containing at least one primary or secondary amine function. For example, the absorbent solution comprises up to a concentration of 30 wt. %, preferably below 15 wt. % and more preferably below 10 wt. % of said compound containing at least one primary or secondary amine function. Preferably, the absorbent solution comprises at least 0.5 wt. % of said compound containing at least one primary or secondary amine function. Said compound enables to accelerate the absorption kinetics of the $CO_2$ and, in some cases, of the COS contained in the gas to be treated.

A non-exhaustive list of compounds containing at least one primary or secondary amine function that can go into the formulation is given below:
  monoethanolamine,
  diethanolamine,
  N-butylethanolamine,
  aminoethylethanolamine,
  diglycolamine,
  piperazine,
  1-methylpiperazine,
  2-methylpiperazine,
  homopiperazine,
  N-(2-hydroxyethyl)piperazine,
  N-(2-aminoethyl)piperazine,
  morpholine,
  3-(metylamino) propylamine,
  1,6-hexanediamine and all the diversely N-alkylated derivatives thereof such as, for example, N,N-dimethyl-1,6-hexanediamine, N,N'-dimethyl-1,6-hexanediamine, N-methyl-1,6-hexanediamine or N,N',N'-trimethyl-1,6-hexanediamine.

The absorbent solution comprising the mixture of 1,2-bis-(2-dimethylaminoethoxy)-ethane and 2-[2-(2-dimethylaminoethoxy)-ethoxy]-ethanol can also contain a mixture of additional primary and/or secondary amines as defined above.

According to an embodiment, the absorbent solution contains organic compounds non reactive towards acid compounds (commonly referred to as "physical solvents"), which allow to increase the solubility of at least one or more acid compounds of the gaseous effluent. For example, the absorbent solution can comprise between 5 wt. % and 50 wt. % of physical solvent such as alcohols, ethers, ether alcohols, glycol and polyethylene glycol ethers, glycol thioethers, glycol and polyethylene glycol esters and alkoxyesters, glycerol esters, lactones, lactames, N-alkylated pyrrolidones, morpholine derivatives, morpholin-3-one, imidazoles and imidazolidinones, N-alkylated piperidones, cyclotetramethylenesulfones, N-alkylformamides, N-alkylacetamides, ether-ketones, alkyl carbonates or alkyl phosphates and derivatives thereof. By way of non limitative example, it can be a solvent or a mixture of several solvents selected from among methanol, ethanol, 2-ethoxyethanol, triethylene glycoldimethylether, tetraethylene glycoldimethylether, pentaethylene glycol-dimethylether, hexaethylene glycoldimethylether, heptaethylene glycol-dimethylether, octaethylene glycol-dimethylether, diethylene glycol butoxyacetate, glycerol triacetate, sulfolane, N-methylpyrrolidone, N-methylmorpholin-3-one, N,N-dimethylformamide, N-formyl-morpholine, N,N-dimethyl-imidazolidin-2-one, N-methyl-imidazole, ethylene glycol, diethylene glycol, triethylene glycol, thiodiglycol, propylene carbonate and tributylphosphate.

Synthesis of the Mixture of Compounds According to the Invention

Synthesis of 2-[2-(2-dimethylaminoethoxy)-ethoxy]-ethanol

Figure 2:
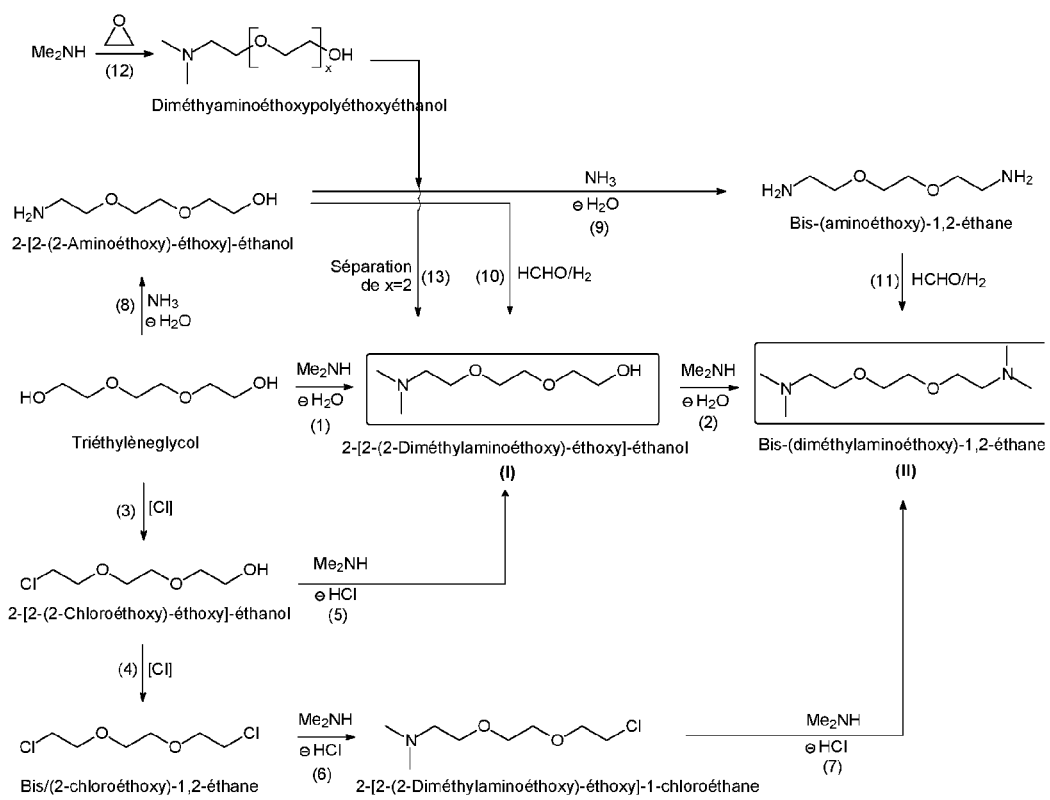

The synthesis of 2-[2-(2-dimethylaminoethoxy)-ethoxy]-ethanol can be achieved via all the routes allowed by organic chemistry. Without being exhaustive, the four routes described below, illustrated in FIG. 2, can be mentioned. In FIG. 2, the arrows show reaction steps, the reactions being numbered from (1) to (13). These are reaction schemes.

First 2-[2-(2-dimethylaminoethoxy)-ethoxy]-ethanol production route

According to this first route, the 2-[2-(2-dimethylaminoethoxy)-ethoxy]-ethanol is obtained by reaction of one mole of dimethylamine with one mole of triethyleneglycol according to a known condensation reaction (reaction 1). This reaction can for example be conducted in the presence of hydrogen and of a suitable catalyst under conditions known to the person skilled in the art. Selective production of 2-[2-(2-dimethylaminoethoxy)-ethoxy]-ethanol via this route is promoted by the use of excess triethylene glycol. Triethylene glycol, which is the precursor in this reaction, is generally obtained by trimerization of ethylene oxide according to a conventional ring opening reaction in the presence of a water molecule. Triethylene glycol is an abundant and inexpensive industrial compound.

Second 2-[2-(2-dimethylaminoethoxy)-ethoxy]-ethanol production route

According to this second route, the 2-[2-(2-dimethylaminoethoxy)-ethoxy]-ethanol is obtained through a reaction of halogenation, chlorination for example, of the triethylene glycol to 2-[2-(2-chloroethoxy)-ethoxy]-ethanol (reaction 3), with a conventional chlorination agent such as hydrochloric acid or thionyl chloride for example, then through a reaction of condensation of the 2-[2-(2-chloroethoxy)-ethoxy]-ethanol with dimethylamine (reaction 5). Selective production of 2-[2-(2-chloroethoxy)-ethoxy]-ethanol via this route can be promoted by the use of excess triethylene glycol.

Third 2-[2-(2-dimethylaminoethoxy)-ethoxy]-ethanol production route

According to this third route, the 2-[2-(2-dimethylaminoethoxy)-ethoxy]-ethanol is obtained first by the reaction of one mole of ammonia with one mole of triethylene glycol according to a known condensation reaction (reaction 8) leading to 2-[2-(2-aminoethoxy)-ethoxy]-ethanol. The primary amine function thereof is subsequently methylated through the reaction of formaldehyde in the presence of hydrogen, generally by means of a suitable catalyst (reaction 10) under conditions known to the person skilled in the art. Selective production of 2-[2-(2-aminoethoxy)-ethoxy]-ethanol according to reaction 8 can be promoted by the use of excess triethylene glycol.

Fourth 2-[2-(2-dimethylaminoethoxy)-ethoxy]-ethanol production route

According to this fourth route, the 2-[2-(2-dimethylaminoethoxy)-ethoxy]-ethanol is obtained by reaction of dimethylamine and ethylene oxide in order to obtain a dimethylaminoethoxypolyethoxyethanol, which is the product of the oligomerization of the ethylene oxide initiated by dimethylamine (reaction 12). The average degree of oligomerization of the mixture of products obtained depends on the molar ratio of ethylene oxide to dimethylamine. The production of 2-[2-(2-dimethylaminoethoxy)-ethoxy]-ethanol requires a 3:1 theoretical molar ratio. Separation of this mixture of oligomers, notably by distillation, allows the 2-[2-(2-dimethylaminoethoxy)-ethoxy]-ethanol to be isolated (step 13).

Synthesis of 1,2-bis-(2-dimethylaminoethoxy)-ethane

The synthesis of 1,2-bis-(2-dimethylaminoethoxy)-ethane (also referred to as bis-(2-dimethylaminoethoxy)-1,2-ethane in FIG. 2) can be achieved via all the routes allowed by organic chemistry. Without being exhaustive, the following three routes can be mentioned.

First 1,2-bis-(2-dimethylaminoethoxy)-ethane production route

According to this first route, the 1,2-bis-(2-dimethylaminoethoxy)-ethane is obtained by reaction of one mole of dimethylamine with one mole of 2-[2-(2-dimethylaminoethoxy)-ethoxy]-ethanol whose synthesis is described above, according to a known condensation reaction (reaction 2). This reaction can for example be conducted in the presence of hydrogen and of a suitable catalyst under conditions known to the person skilled in the art.

1,2-bis-(2-dimethylaminoethoxy)-ethane can also be obtained by conducting this reaction directly from triethylene glycol instead of 2-[2-(2-dimethylaminoethoxy)-ethoxy]-ethanol, using 2 moles of dimethylamine, i.e. by combining reactions 1 and 2 in the same step.

Second 1,2-bis-(2-dimethylaminoethoxy)-ethane production route

According to this second route, the 1,2-bis-(2-dimethylaminoethoxy)-ethane is obtained through a reaction of halogenation, chlorination for example, of the 2-[2-(2-chloroethoxy)-ethoxy]-ethanol whose synthesis is described above, to bis-(2-chloroethoxy)-1,2-ethane (reaction 4), with a conventional chlorination agent such as hydrochloric acid or thionyl chloride for example, then through a reaction of condensation of the bis-(2-chloroethoxy)-1,2-ethane with dimethylamine leading to 2-[2-(2-dimethylaminoethoxy)-ethoxy]-1-chloroethane, followed by the condensation reaction of the 2-[2-(2-dimethylaminoethoxy)-ethoxy]-1-chloroethane with dimethylamine, leading to 1,2-bis-(2-dimethylaminoethoxy)-ethane (sequence of reactions 6 and 7).

1,2-bis-(2-dimethylaminoethoxy)-ethane can also be obtained by conducting this reaction directly from triethylene glycol instead of 2-[2-(2-dimethylaminoethoxy)-ethoxy]-ethanol, i.e. by combining reactions 3 and 4 in the same step, then 6 and 7 in the same step.

Third 1,2-bis-(2-dimethylaminoethoxy)-ethane production route

According to this third route, the 1,2-bis-(2-dimethylaminoethoxy)-ethane is obtained first by the reaction of one mole of ammonia with one mole of 2-[2-(2-aminoethoxy)-ethoxy]-ethanol whose synthesis is described above, according to a known condensation reaction (reaction 9) leading to bis-(aminoethoxy)-1,2-ethane. The primary amine functions thereof are subsequently methylated through the reaction of formaldehyde in the presence of hydrogen, generally by means of a suitable catalyst (reaction 11) under conditions known to the person skilled in the art.

Bis-(aminoethoxy)-1,2-ethane can also be obtained directly from triethylene glycol instead of 2-[2-(2-aminoethoxy)-ethoxy]-ethanol, using 2 moles of ammonia for combining reactions 8 and 9.

Synthesis of a mixture of 2-[2-(2-dimethylaminoethoxy)-ethoxy]-ethanol and 1,2-bis-(2-dimethylaminoethoxy)-ethane Within the context of the invention where it is desired to use mixtures of 2-[2-(2-dimethylaminoethoxy)-ethoxy]-ethanol and 1,2-bis-(2-dimethylaminoethoxy)-ethane, it is possible to perform the synthesis of each one of these molecules separately using all the synthesis routes allowed for each molecule, as described above for example, then to mix the two molecules.

Advantageously, the synthesis of 2-[2-(2-dimethylaminoethoxy)-ethoxy]-ethanol and 1,2-bis-(2-dimethylaminoethoxy)-ethane can be conducted in the same steps and a mixture of these two molecules is then obtained.

A mixture of 2-[2-(2-dimethylaminoethoxy)-ethoxy]-ethanol and 1,2-bis-(2-dimethylaminoethoxy)-ethane can for example be obtained directly through the reaction of dimethylamine and triethylene glycol according to a known condensation reaction, by adjusting the dimethylamine/triethylene glycol ratio so as to obtain, according to reaction 1 and the sequence of reactions 1 and 2, a mixture of 2-[2-(2-dimethylaminoethoxy)-ethoxy]-ethanol and 1,2-bis-(2-dimethylaminoethoxy)-ethane in the desired proportions.

These reactions can for example be carried out in the presence of hydrogen and of a suitable catalyst under conditions abundantly mentioned in the literature.

A mixture of 2-[2-(2-dimethylaminoethoxy)-ethoxy]-ethanol and 1,2-bis-(2-dimethyl-aminoethoxy)-ethane can also be obtained directly through a reaction of halogenation, for example of chlorination of the triethylene glycol, by adjusting the chlorination agent/triethylene glycol ratio so as to obtain, according to reaction 3 and the sequence of reactions 3 and 4, a mixture of 2-[2-(2-chloroethoxy)-ethoxy]-ethanol and bis-(2-chloroethoxy)-1,2-ethane in the desired proportions. The reaction of the dimethylamine with this mixture of 2-[2-(2-chloroethoxy)-ethoxy]-ethanol and bis-(2-chloroethoxy)-1,2-ethane directly leads to the mixture of 2-[2-(2-dimethylaminoethoxy)-ethoxy]-ethanol and 1,2-bis-(2-dimethylaminoethoxy)-ethane according to reactions 5 and 6 plus 7 that are carried out in the same step.

A mixture of 2-[2-(2-dimethylaminoethoxy)-ethoxy]-ethanol and 1,2-bis-(2-dimethyl-aminoethoxy)-ethane can also be obtained directly through the reaction of ammonia and triethylene glycol, according to a known condensation reaction, by adjusting the ammonia/triethylene glycol ratio so as to obtain, according to reaction 8 and the sequence of reactions 8 and 9, a mixture of 2-[2-(2-aminoethoxy)-ethoxy]-ethanol and bis-(aminoethoxy)-1,2-ethane in the desired proportions. The primary amine functions of the molecules making up this mixture are subsequently methylated by reaction of formaldehyde in the presence of hydrogen and generally by means of a suitable catalyst under conditions abundantly mentioned in the literature, so as to lead to the mixture of 2-[2-(2-dimethylaminoethoxy)-ethoxy]-ethanol and 1,2-bis-(2-dimethyl-aminoethoxy)-ethane in the desired proportions, according to reactions 10 and 11 that are carried out here in the same step.

Nature of the Gaseous Effluents

The absorbent solutions according to the invention can be used for deacidizing the following gaseous effluents: natural gas, syngas, combustion fumes, blast furnace fumes, refinery gas such as syngas, cracked gas, combustible gas commonly referred to as fuel gas, acid gas from an amine plant, Claus tail gas, biomass fermentation gas, cement plant gas and incinerator fumes.

These gaseous effluents contain one or more of the following acid compounds: $CO_2$, $H_2S$, mercaptans (for example methylmercaptan ($CH_3SH$), ethylmercaptan ($CH_3CH_2SH$), propylmercaptan ($CH_3CH_2CH_2SH$)), COS, $CS_2$, $SO_2$.

Combustion fumes are produced notably by the combustion of hydrocarbons, biogas, coal in a boiler or for a combustion gas turbine, for example in order to produce electricity. By way of illustration, a deacidizing method according to the invention can be implemented for absorbing at least 70%, preferably at least 80% or even at least 90% of the $CO_2$ contained in combustion fumes. These fumes generally have a temperature ranging between 20° C. and 60° C., a pressure ranging between 1 and 5 bar, and they can comprise between 50 and 80% nitrogen, between 5 and 40% carbon dioxide, between 1 and 20% oxygen, and some impurities such as SOx and NOx if they have not been removed upstream from the deacidizing process. In particular, the deacidizing method according to the invention is particularly well suited for absorbing the $CO_2$ contained in combustion fumes having a low $CO_2$ partial pressure, for example a $CO_2$ partial pressure below 200 mbar.

The deacidizing method according to the invention can be implemented for deacidizing a syngas. Syngas contains carbon monoxide CO, hydrogen $H_2$ (generally with a $H_2$/CO ratio of 2), water vapour (generally at saturation at the wash temperature) and carbon dioxide $CO_2$ (of the order of 10%). The pressure generally ranges between 20 and 30 bar, but it can reach up to 70 bar. It can also comprise sulfur-containing ($H_2S$, COS, etc.), nitrogen-containing ($NH_3$, HCN) and halogenated impurities.

The deacidizing method according to the invention can be implemented for deacidizing a natural gas. Natural gas predominantly consists of gaseous hydrocarbons, but it can contain some of the following acid compounds: $CO_2$, $H_2S$, mercaptans, COS, $CS_2$. The proportion of these acid compounds is very variable and it can reach up to 70 vol. % for $CO_2$ and up to 40 vol. % for $H_2S$. The temperature of the natural gas can range between 20° C. and 100° C. The pressure of the natural gas to be treated can range between 10 and 200 bar. The invention can be implemented in order to reach specifications generally imposed on deacidized gas, which are less than 2% $CO_2$, or even less than 50 vol·ppm $CO_2$ so as to subsequently carry out liquefaction of the natural gas, less than 4 vol·ppm $H_2S$, and less than 50 vol·ppm or even less than 10 vol·ppm total sulfur.

Method of Removing Acid Compounds from a Gaseous Effluent

Using an absorbent solution according to the invention for deacidizing a gaseous effluent is schematically done by carrying out an absorption stage followed by a regeneration stage, as shown in FIG. 1 for example.

With reference to FIG. 1, the plant for deacidizing a gaseous effluent according to the invention comprises an absorption column C1 provided with means for contacting the gas and the liquid, for example a random packing, a structured packing or trays. The gaseous effluent to be treated is fed through a line 1 opening into the bottom of column C1. A line 4 allows the absorbent solution to be fed to the top of column C1. A line 2 allows the treated (deacidized) gas to be discharged and a line 3 allows the absorbent solution enriched in acid compounds following absorption to be sent to a regeneration column C2. This regeneration column C2 is provided with gas-liquid contacting internals, for example trays, random or structured packings. The bottom of column C2 is equipped with a reboiler R1 that provides the heat required for regeneration by vaporizing a fraction of the absorbent solution. The acid compound-enriched solution is fed to the top of regeneration column C2 through a line 5. A line 7 allows to discharge at the top of column C2 the gas enriched in acid compounds released upon regeneration, and a line 6 arranged in the bottom of column C2 allows the regenerated absorbent solution to be sent to absorption column C1. A heat exchanger E1 allows the heat of the regenerated absorbent solution from column C2 to be recovered so as to heat the acid compound-enriched absorbent solution leaving absorption column C1.

The absorption stage consists in contacting the gaseous effluent delivered through line 1 with the absorbent solution delivered through line 4. Upon contact, the amine functions of the molecules according to general formula (I) of the absorbent solution react with the acid compounds contained in the effluent so as to obtain an acid compound-depleted gaseous effluent that is discharged through line 2 at the top of column C1 and an acid compound-enriched absorbent solution that is discharged through line 3 in the bottom of column C1 to be regenerated.

The acid compound absorption stage can be carried out at a pressure in column C1 ranging between 1 and 200 bar, preferably between 20 and 100 bar for natural gas treatment, preferably between 1 and 3 bar for industrial fumes treatment, and at a temperature in column C1 ranging between 20° C. and 100° C., preferably between 30° C. and 90° C., or even between 30° C. and 60° C.

The regeneration stage notably consists in heating and optionally in expanding the acid compound-enriched absorbent solution so as to release the acid compounds in gas form. The acid compound-enriched absorbent solution leaving column C1 is fed to heat exchanger E1 where it is heated by the stream circulating in line 6 and coming from regeneration column C2. The heated solution at the outlet of E1 is fed to regeneration column C2 through line 5.

In regeneration column C2, under the effect of contacting the absorbent solution flowing in through line 5 with the vapour produced by the reboiler, the acid compounds are released in gas form and discharged at the top of column C2 through line 7. The regenerated absorbent solution, i.e. depleted in acid compounds, is discharged through line 6 and cooled in E1, then recycled to absorption column C1 through line 4.

The regeneration stage can be carried out by thermal regeneration, optionally complemented by one or more expansion stages. For example, the acid compound-enriched absorbent solution discharged through line 3 can be sent to a first flash drum (not shown) prior to being sent to heat exchanger E1. In the case of a natural gas, expansion allows to obtain a gas discharged at the top of the drum that contains the major part of the aliphatic hydrocarbons co-absorbed by the absorbent solution. This gas can be optionally washed by a fraction of the regenerated absorbent solution and the gas thus obtained can be used as fuel gas. The flash drum preferably operates at a lower pressure than absorption column C1 and a higher pressure than regeneration column C2. This pressure is generally determined by the conditions of use of the fuel gas, and it is typically of the order of 5 to 15 bar. The flash drum operates at a temperature substantially identical to the temperature of the absorbent solution obtained in the bottom of absorption column C1.

Regeneration can be carried out at a pressure in column C2 ranging between 1 and 5 bar, or even up to 10 bar, and at a temperature in column C2 ranging between 100° C. and 180° C., preferably between 110° C. and 170° C., more preferably between 120° C. and 140° C. Preferably, the regeneration temperature in column C2 ranges between 155° C. and 180° C. in cases where the acid gases are intended to be reinjected. Preferably, the regeneration temperature in column C2 ranges between 115° C. and 130° C. in cases where the acid gas is sent to the atmosphere or to a downstream treating process such as a Claus process or a tail gas treating process.

EXAMPLES

The examples below illustrate, by way of non limitative example, some of the performances of the compounds according to formulas (I) and (II) in admixture when used in aqueous solution for removing acid compounds, such as $CO_2$ or $H_2S$, contained in a gaseous effluent by contacting the gaseous effluent with the solution.

Example 1: $H_2S$ Absorption Capacity of Aqueous Amine Solutions for an Acid Gas Treating Method The $H_2S$ absorption capacity performances at 40° C. of an aqueous solution of 1,2-bis-(2-dimethylaminoethoxy)-ethane in admixture with 2-[2-(2-dimethylaminoethoxy)-ethoxy]-ethanol according to the invention (solution (e)), containing 30 wt. % 1,2-bis-(2-dimethylaminoethoxy)-ethane and 20 wt. % 2-[2-(2-dimethylaminoethoxy)-ethoxy]-ethanol, are compared with the following solutions:
  solution (a): an aqueous MDEA solution containing 50 wt. % MDEA, which is a reference absorbent solution for selective removal in gas treatment;
  solution (c): an aqueous solution according to the prior art (U.S. Pat. No. 4,405,582) of 1,2-bis-(2-dimethylaminoethoxy)-ethane containing 30 wt. % 1,2-bis-(2-dimethylaminoethoxy)-ethane;
  solution (b): an aqueous solution according to the prior art (U.S. Pat. No. 4,405,582) of 1,2-bis-(2-dimethylaminoethoxy)-ethane containing 50 wt. % 1,2-bis-(2-dimethylaminoethoxy)-ethane;
  solution (d): an aqueous solution according to the prior art (U.S. Pat. No. 4,405,582) of a mixture of 1,2-bis-(2-dimethylaminoethoxy)-ethane and MDEA, containing 30 wt. % 1,2-bis-(2-dimethylaminoethoxy)-ethane in admixture with 20 wt. % MDEA.

An absorption test is carried out at 40° C. on these aqueous amine solutions in a thermostat-controlled equilibrium cell. This test consists in injecting into the equilibrium cell, previously filled with degassed aqueous amine solution, a known amount of acid gas, $H_2S$ in this example, then in waiting for the equilibrium state to be reached. The amounts of acid gas absorbed in the aqueous amine solution are then deduced from the temperature and pressure measurements by means of material and volume balances. The solubilities are conventionally represented in form of $H_2S$ partial pressures (in bar) as a function of the $H_2S$ loading (in mol of $H_2S$/kg absorbent solution and in mol of $H_2S$/mol of amine).

In the case of deacidizing a $H_2S$-containing natural gas, the $H_2S$ partial pressures encountered in acid gases typically range between 0.1 and 1 bar. By way of example, in this industrial range, Table 1 hereafter compares the $H_2S$ loadings obtained at 40° C. for various $H_2S$ partial pressures between the MDEA absorbent solution (a), the absorbent solution according to the invention (e), and the other three aqueous solutions according to U.S. Pat. No. 4,405,582 (b), (c) and (d).

TABLE 1

| Solution reference | Amines in aqueous solution | Wt. % diamine (I) | Wt. % amine (II) | Wt. % MDEA | [amine function] (mole/kg) | Loading at 40° C. (mole $H_2S$/kg) solvent | | |
|---|---|---|---|---|---|---|---|---|
| | | | | | | P = 0.1 bar | P = 0.3 bar | P = 1 bar |
| (a) | MDEA | 0% | 0% | 50% | 4.20 | 0.88 | 1.64 | 2.91 |
| (b) | Diamine I: 1,2-bis-(2-dimethylaminoethoxy)-ethane (according to patent U.S. Pat. No. 4,405,582) | 50% | 0% | 0% | 4.90 | 0.14 | 0.39 | 1.95 |

TABLE 1-continued

| Solution reference | Amines in aqueous solution | Wt. % diamine (I) | Wt. % amine (II) | Wt. % MDEA | [amine function] (mole/kg) | Loading at 40° C. (mole $H_2S$/kg) solvent | | |
|---|---|---|---|---|---|---|---|---|
| | | | | | | P = 0.1 bar | P = 0.3 bar | P = 1 bar |
| (c) | Diamine I: 1,2-bis-(2-dimethylaminoethoxy)-ethane (according to patent U.S. Pat. No. 4,405,582) | 30% | 0% | 0% | 2.94 | 0.99 | 1.98 | 2.69 |
| (d) | Diamine I: 1,2-bis-(2-dimethylaminoethoxy)-ethane + MDEA (according to patent U.S. Pat. No. 4,405,582) | 30% | 0% | 20% | 4.62 | 0.80 | 1.78 | 3.39 |
| (e) | Diamine I: 1,2-bis-(2-dimethylaminoethoxy)-ethane + monoamine II: 2-[2-(2-dimethylaminoethoxy)-ethoxy]-ethanol | 30% | 20% | 0% | 4.07 | 1.46 | 2.32 | 3.52 |

At 40° C., whatever the $H_2S$ partial pressure, the absorption capacity of the aqueous solution according to the invention (e) is higher than that of the reference MDEA solution containing the same percentage by weight of amine and a higher amine function concentration. This capacity gain allows to distinguish the formulation according to the invention (e) from the formulations according to the prior art based on 1,2-bis-(2-dimethylaminoethoxy)-ethane and/or MDEA.

Indeed, at a 0.1 bar partial pressure, the $H_2S$ loading is 1.46 mol/kg in the absorbent solution according to the invention (e) and 0.88 mol/kg in the reference MDEA absorbent solution (a). At a $H_2S$ partial pressure of 0.1 bar, the difference between the $H_2S$ loadings of the two absorbent solutions is 0.58 mol/kg with an absorption capacity for the absorbent solution according to the invention (e) increased by 66% in relation to the reference MDEA absorbent solution (a) containing the same percentage by weight of amine and with yet a higher amine function concentration.

This gain still is 47% in relation to solution (c) according to the prior art containing the same percentage by weight (30%) of 1,2-bis-(2-dimethylaminoethoxy)-ethane as the formulation according to the invention (e). On the other hand, the absorption capacity of aqueous solution (b) containing 50 wt. % 1,2-bis-(2-dimethylaminoethoxy)-ethane according to the prior art decreases by 84% in relation to the reference MDEA solution (a) containing the same percentage by weight of amine and with yet a lower amine function concentration. Similarly, the $H_2S$ absorption capacity for a 0.1 bar partial pressure of the aqueous solution according to the prior art (d) containing 30 wt. % 1,2-bis-(2-dimethylaminoethoxy)-ethane and 20 wt. % MDEA decreases by 9% in relation to the reference MDEA solution (a) containing the same percentage by weight of amine (50%) and with yet a lower amine function concentration.

At a $H_2S$ partial pressure of 0.3 bar, the $H_2S$ loading difference between the absorbent solution according to the invention (e) and the reference MDEA solution (a) reaches 41% in favour of the absorbent solution according to the invention. This gain still is 17% in relation to an aqueous solution (c) containing the same percentage by weight (30%) of 1,2-bis-(2-dimethylaminoethoxy)-ethane as the formulation according to the invention (e). The $H_2S$ loading difference still is 30% in relation to aqueous solution (e) according to the prior art containing the same percentage by weight of 1,2-bis-(2-dimethylaminoethoxy)-ethane (30%), the same percentage by weight of amine (50%) and yet a higher amine function concentration than the formulation according to the invention (e). On the other hand, the absorption capacity of solution (b) according to the prior art decreases by 76% in relation to the reference MDEA solution (a) containing the same percentage by weight of amine (50%) and with yet a lower amine function concentration.

At a $H_2S$ partial pressure of 1 bar, the $H_2S$ loading difference between the absorbent solution according to the invention (e) and the reference MDEA solution (a) reaches 21% in favour of the absorbent solution according to the invention. This gain still is 31% in relation to an aqueous solution (c) containing the same percentage by weight (30%) of 1,2-bis-(2-dimethylaminoethoxy)-ethane as the formulation according to the invention (e). It still is 4% in relation to aqueous solution (d) according to the prior art containing the same percentage by weight of 1,2-bis-(2-dimethylaminoethoxy)-ethane (30%), the same percentage by weight of amine (50%) and yet a higher amine function concentration than the formulation according to the invention (e). On the other hand, the absorption capacity of aqueous solution (b) containing 50 wt. % 1,2-bis-(2-dimethylaminoethoxy)-ethane according to the prior art decreases by 33% in relation to the reference MDEA solution (a) containing the same percentage by weight of amine and with yet a lower amine function concentration.

It can thus be observed that, unlike other solutions of the prior art, the solution according to the invention (e) has a higher $H_2S$ absorption capacity than the reference 50 wt. % MDEA aqueous solution (a) and than the various exemplified solutions according to the prior art, at 40° C., in the $H_2S$ partial pressure range between 0.1 and 1 bar corresponding to a partial pressure range representative of usual industrial conditions. It appears that the exemplified absorbent solution according to the invention allows to reduce the solvent flow rates required in $H_2S$-containing gas deacidizing applications in relation to the reference MDEA absorbent solution or to other solutions of the prior art.

Example 2: $CO_2$ Absorption Capacity of Amine Formulations for an Acid Gas Treating Method The $CO_2$ absorption capacity performances at 40° C. of an aqueous solution of 1,2-bis-(2-dimethylaminoethoxy)-ethane in admixture with 2-[2-(2-dimethylaminoethoxy)-ethoxy]-ethanol according to the invention, containing 30 wt. % 1,2-bis-(2-dimethylaminoethoxy)-ethane and 20 wt. % 2-[2-(2-dimethylaminoethoxy)-ethoxy]-ethanol (solution (e)), are compared with those of:

an aqueous MDEA solution containing 47 wt. % MDEA, which is a reference absorbent solution for selective removal in gas treatment (solution (f)); and an aqueous solution of 1,2-bis-(2-dimethylaminoethoxy)-ethane (according to U.S. Pat. No. 4,405,582) containing 30 wt. % 1,2-bis-(2-dimethylaminoethoxy)-ethane (solution (c)).

An absorption test is carried out at 40° C. on aqueous amine solutions in a thermostat-controlled equilibrium cell according to the same method of operation as the one described in the previous example, by replacing the $H_2S$ by $CO_2$.

In the case of natural gas deacidizing, the $CO_2$ partial pressures encountered in acid gases are typically greater than or equal to 1 bar. By way of example, in this industrial range, Table 2 hereafter compares the $CO_2$ loadings obtained at 40° C. for a 1 bar $CO_2$ partial pressure between the 47 wt. % MDEA aqueous solution (f), the solution according to the invention (e) and the aqueous solution according to the prior art (c).

TABLE 2

| Solution reference | Amines in aqueous solution | Wt. % diamine (I) | Wt. % amine (II) | Wt. % MDEA | Loading at 40° C. (mole $CO_2$/kg) solvent for a 1 bar $CO_2$ partial pressure $PCO_2$ = 1 bar |
|---|---|---|---|---|---|
| (f) | MDEA | 0% | 0% | 47% | 2.73 |
| (c) | Diamine I: 1,2-bis-(2-dimethyl-aminoethoxy)-ethane (according to patent U.S. Pat. No. 4,405,582) | 30% | 0% | 0% | 2.67 |
| (e) | Diamine I: 1,2-bis-(2-dimethyl-aminoethoxy)-ethane + mono-amine II: 2-[2-(2-dimethyl-aminoethoxy)-ethoxy]-ethanol | 30% | 20% | 0% | 3.25 |

At 40° C., for a 1 bar $CO_2$ partial pressure, the absorption capacity of the aqueous solution according to the invention (e) is higher than that of the reference solution (f) containing the same percentage by weight of amine and a higher amine function concentration. This capacity gain allows to distinguish the formulation according to the invention from the formulations according to the prior art based on 1,2-bis-(2-dimethylaminoethoxy)-ethane.

Indeed, at a 1 bar partial pressure, the $CO_2$ loading is 3.25 mol/kg in the absorbent solution according to the invention (e) and 2.73 mol/kg in the absorbent MDEA solution (f). The difference between the $CO_2$ loadings of the two absorbent solutions is 0.52 mol/kg with an absorption capacity for the absorbent solution according to the invention (e) increased by 19% in relation to the reference MDEA absorbent solution (f). On the other hand, the absorption capacity of the aqueous solution according to the prior art (c) has decreased by 2% in relation to the reference MDEA solution (f).

It can thus be observed that, unlike another solution of the prior art, the aqueous solution according to the invention (e) has a higher $CO_2$ absorption capacity than the MDEA aqueous solution (f) and than the solution according to the prior art (c), at 40° C., in a 1 bar $CO_2$ partial pressure range within a partial pressure range representative of usual industrial conditions. It appears that the exemplified absorbent solution according to the invention (e) allows to reduce the solvent flow rates required in $CO_2$-containing gas deacidizing applications in relation to the reference MDEA absorbent solution or to other solutions of the prior art.

Example 3: $CO_2$ Absorption Rate of an Amine Formulation for a Selective Absorption Method A comparative measurement of the $CO_2$ absorption rate is performed between an absorbent solution containing 30 wt. % 1,2-bis-(2-dimethylaminoethoxy)-ethane and 20 wt. % 2-[2-(2-dimethylaminoethoxy)-ethoxy]-ethanol according to the invention (solution (e)), and an aqueous solution of N-methyldiethanolamine (MDEA) with 47 wt. % MDEA (solution (f)), which is the reference absorbent solution for selective removal in gas treatment.

For each test, the $CO_2$ flow absorbed by the aqueous absorbent solution is measured in a stirred closed reactor at a controlled temperature of 40° C. 50 g of solution are fed to the closed reactor. A $CO_2$ injection is carried out at 1 bar in the vapour phase of the 50 cm$^3$-volume reactor. The gas phase and the liquid phase are stirred at 600 rpm. The $CO_2$ absorption rate is measured through pressure variation in the gas phase. A global transfer coefficient Kg is thus determined.

The results obtained are shown in Table 3 hereafter in relative absorption rate in relation to the reference MDEA aqueous absorbent solution (f), this relative absorption rate being defined by the ratio of the global transfer coefficient of the absorbent solution tested to the global transfer coefficient of the reference absorbent solution (with MDEA).

TABLE 3

| Solution reference | Absorbent solution | $CO_2$ relative absorption rate a at 50° C. |
|---|---|---|
| (f) | 47 wt. % MDEA | 1.00 |
| (e) | 30 wt. % 1,2-bis-(2-dimethyl-aminoethoxy)-ethane + 20 wt. % 2-[2-(2-dimethyl-aminoethoxy)-ethoxy]-ethanol | 0.91 |

The results show, under these test conditions, a slower rate of absorption of $CO_2$ by the absorbent solution according to the invention compared to the reference formulation with MDEA (f). It therefore appears that the exemplified absorbent solution according to the invention surprisingly is of particular and improved interest in the case of selective deacidizing of a gaseous effluent where the $CO_2$ absorption kinetics is to be limited.

The $H_2S$ absorption capacity of the exemplified absorbent solution according to the invention being higher than that of a MDEA aqueous solution (see Example 1 above), it appears that the exemplified absorbent solution according to the invention (e) allows to reduce the absorbent solution flow rates required in selective deacidizing applications (H₂S over CO₂) for absorbing a given flow of H₂S while reducing the flow of co-absorbed CO₂ in relation to the reference MDEA absorbent solution.

APPENDIX: LIST OF THE MOLECULES REPRESENTED IN FIG. 2

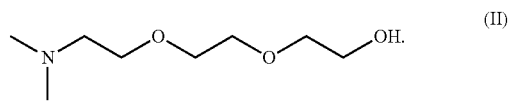

the absorbent solution for removing acid compounds contained in a gaseous effluent.

| Ref. | Name | Formula |
|---|---|---|
| P1 | 2-[2-(2-dimethylaminoethoxy)-ethoxy]-ethanol | |
| P2 | 1,2-bis-(2-dimethylaminoethoxy)-ethane Or bis-(2-dimethylaminoethoxy)-1,2-ethane | |
| P3 | dimethylaminoethoxypolyethoxyethanol | |
| P4 | 2-[2-(2-aminoethoxy)-ethoxy]-ethanol | |
| P5 | bis-(aminoethoxy)-1,2-ethane | |
| P6 | Triethylene glycol | |
| P7 | 2-[2-(2-chloroethoxy)-ethoxy]-ethanol | |
| P8 | bis-(2-chloroethoxy)-1,2-ethane | |
| P9 | 2-[2-(2-dimethylaminoethoxy)-ethoxy]-1-chloroethane | |
| P10 | Dimethylamine | (CH₃)₂NH |
| P11 | Ethylene oxide | |

The invention claimed is:

1. An absorbent solution comprising:
water;
an amine mixture comprising 1,2-bis-(2-dimethylaminoethoxy)-ethane of formula (I) as follows:

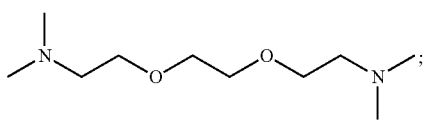

(I)

and
2-[2-(2-dimethylaminoethoxy)-ethoxy]-ethanol of formula (II) as follows:

2. An absorbent solution as claimed in claim 1, comprising between 5 wt. % and 95 wt. % of amine mixture and between 5 wt. % and 95 wt. % of water.

3. An absorbent solution as claimed in claim 2, comprising between 10 wt. % and 90 wt. % of amine mixture and between 10 wt. % and 90 wt. % of water.

4. An absorbent solution as claimed in claim 1, wherein the mass concentration ratio of 1,2-bis-(2-dimethylaminoethoxy)-ethane to 2-[2-(2-dimethylaminoethoxy)-ethoxy]-ethanol ranges between 0.25 and 10.

5. An absorbent solution as claimed in claim 4, wherein the mass concentration ratio of 1,2-bis-(2-dimethylaminoethoxy)-ethane to 2-[2-(2-dimethylaminoethoxy)-ethoxy]-ethanol ranges between 0.5 and 2.

6. An absorbent solution as claimed in claim 1, further comprising between 5 wt. % and 50 wt. % of at least one additional amine, said additional amine being either a tertiary amine or a secondary amine having two secondary carbons at nitrogen alpha position or at least one tertiary carbon at nitrogen alpha position.

7. An absorbent solution as claimed in claim 6, wherein said additional amine is a tertiary amine selected from among the group made up of:
N-methyldiethanolamine,
triethanolamine,
diethylmonoethanolamine,
dimethylmonoethanolamine,
ethyldiethanolamine,
2-(2-dimethylaminoethoxy)-ethanol,
dimethylethylamine,
dimethylethoxyethylamine,
bis(dimethylaminoethyl)ether, and
tetramethylethylenediamine.

8. An absorbent solution as claimed in claim 1, additionally comprise a non-zero amount less than 30 wt. % of at least one primary amine or secondary amine.

9. An absorbent solution as claimed in claim 8, wherein said primary or secondary amine is selected from among the group made up of:
monoethanolamine,
diethanolamine,
N-butylethanolamine,
aminoethylethanolamine,
diglycolamine,
piperazine,
1-methylpiperazine,
2-methylpiperazine,
homopiperazine,
N-(2-hydroxyethyl)piperazine,
N-(2-aminoethyl)piperazine,
morpholine,
3-(methylamino)propylamine,
1,6-hexanediamine,
N,N-dimethyl-1,6-hexanediamine,
N,N'-dimethyl-1,6-hexanediamine,
N-methyl-1,6-hexanediamine, and
N,N',N'-trimethyl-1,6-hexanediamine.

10. An absorbent solution as claimed in claim 1, further comprising at least one physical solvent selected from among the group made up of methanol, ethanol, 2-ethoxyethanol, triethylene glycoldimethylether, tetraethylene glycoldimethylether, pentaethylene glycoldimethylether, hexaethylene glycol-dimethylether, heptaethylene glycol-dimethylether, octaethylene glycoldimethylether, diethylene glycol butoxyacetate, glycerol triacetate, sulfolane, N-methylpyrrolidone, N-methylmorpholin-3-one, N,N-dimethyl-formamide, N-formyl-morpholine, N,N-dimethyl-imidazolidin-2-one, N-methylimidazole, ethylene glycol, diethylene glycol, triethylene glycol, thiodiglycol and tributyl phosphate.

11. A method of removing acid compounds contained in a gaseous effluent wherein an acid compound absorption stage is carried out by contacting the gaseous effluent with an absorbent solution as claimed in claim 1.

12. A method as claimed in claim 11, wherein the acid compound absorption stage is carried out at a pressure ranging between 1 bar and 200 bar, and at a temperature ranging between 20° C. and 100° C.

13. A method as claimed in claim 11, wherein an acid compound-laden absorbent solution is obtained after the absorption stage and at least one stage of regenerating said acid compound-laden absorbent solution is carried out at a pressure ranging between 1 bar and 10 bar, and at a temperature ranging between 100° C. and 180° C.

14. A method as claimed in claim 11, wherein the gaseous effluent is selected from among natural gas, syngas, combustion fumes, blast furnace fumes, refinery gas, cracked gas, combustible gas, acid gas from an amine plant, Claus tail gas, biomass fermentation gas, cement plant gas and incinerator fumes.

15. A method as claimed in claim 14, wherein the gaseous effluent is refinery gas comprising syngas.

16. A method as claimed in claim 11, implemented for selectively removing the $H_2S$ over the $CO_2$ from a gaseous effluent comprising $H_2S$ and $CO_2$.

17. A method as claimed in claim 16, wherein the gaseous effluent comprises natural gas.

\* \* \* \* \*